United States Patent [19]
Berdut

[11] Patent Number: 5,452,663
[45] Date of Patent: Sep. 26, 1995

[54] LEVITATION AND PROPULSION SYSTEM USING PERMANENT MAGNETS AND INTERLEAVED IRON OR STEEL

[76] Inventor: Elberto Berdut, Orquidea No. 98, Santa Maria, Santa Mario, Guaynabo, Puerto Rico, 00926

[21] Appl. No.: 184,440

[22] Filed: Jan. 21, 1994

Related U.S. Application Data

[63] Continuation-in-part of Ser. No. 45,863, Apr. 14, 1993.

[51] Int. Cl.[6] .................................................. B60L 13/10
[52] U.S. Cl. ........................... 104/283; 104/286; 104/290; 104/294; 310/12
[58] Field of Search ..................... 104/281, 284, 104/286, 290, 292, 294, 283; 318/135; 310/12, 13, 14

[56] References Cited

U.S. PATENT DOCUMENTS

| | | | |
|---|---|---|---|
| 3,791,309 | 2/1974 | Baermann | 104/283 |
| 3,895,585 | 7/1975 | Schwarzler | 104/290 |
| 3,899,979 | 8/1975 | Godsey, Jr. | 104/283 |
| 4,148,260 | 4/1979 | Minovitch | 104/283 X |
| 4,151,447 | 4/1979 | von der Heide et al. | 104/290 X |
| 4,307,668 | 12/1981 | Vinson | 104/281 |
| 4,641,065 | 2/1987 | Shibuki et al. | 310/13 X |
| 4,711,182 | 12/1987 | Alexander et al. | 104/283 |
| 5,072,144 | 12/1991 | Suito et al. | 310/12 |
| 5,165,347 | 11/1992 | Wagner | 104/283 |

Primary Examiner—Robert J. Oberleitner
Assistant Examiner—S. Joseph Morano
Attorney, Agent, or Firm—Ronald P. Kananen

[57] ABSTRACT

The invention relates to a magnetic unit having a plurality of groups of permanent magnets such as ceramic or ferrous magnets arranged in a side-by-side relationship, each plurality being separated from an adjacent plurality by a magnetically permeable member, such as a malleable steel member or a malleable iron or molded iron member to focus the lines of magnetic flux. Preferably, each of the permanent magnets within a group is also separated by an interleaved sheet of magnetically permeable material. Such a plurality of groups of permanent magnets are secured together and to a supporting member through fastening members, and are separated from the support by a non-magnetic member, such as a non-ferrous plate. A second plurality of groups of permanent magnets are positioned adjacent to a first plurality of such groups of permanent magnets with opposite poles of the magnets facing each other so that the first and the second pluralities of such groups of magnetics attract one another to cause levitation of a vehicle such as a train. A plurality of such groups of magnetic units are so arranged relative to a support member of a train and an adjacent track member. A hydraulic unit, which may be microprocessor controlled, is used to adjust the air gap between respective pairs of such units. A third main feature of the invention relates to the use of such units to provide a main component of a linear motor for propelling the train along the track.

33 Claims, 9 Drawing Sheets

LEVITATION AND PROPULSION SYSTEM USING PERMANENT MAGNETS AND INTERLEAVED IRON OR STEEL

This application is a continuation-in-part of copending U.S. Patent application Ser. No. 08/045,863, filed on Apr. 14, 1993 still pending.

BACKGROUND OF THE INVENTION

This invention relates to a movable vehicle, such as a train, which uses a plurality of magnetic units, each comprising a plurality of permanent magnets and interleaved iron or steel members, for both levitation and for acting as a linear or rotary motor. More particularly, this invention relates to a levitated train using such magnetic units arranged to repel or attract each other, thus to lift the train off of a track while being laterally supported. More particularly, this invention relates to a levitated train which uses such magnetic units as a basis for a linear motor for propelling the train. Still more particularly, this invention relates to the magnetic units themselves, each having a plurality of permanent ceramic or ferrous magnets interleaved between associated sheets of malleable steel or malleable or molded iron.

DESCRIPTION OF THE PRIOR ART

In U.S. Pat. No. 3,791,309 to Baermann, it was recognized that it has been known to suspend vehicles such as trains along a supporting line or track by air cushions, or along a track made from a magnetically attracted material. In one such vehicle, the vehicle has electromagnets mounted thereon and the vehicle is suspended with respect to the track by utilizing the attractive forces between the electromagnets and the track. Some means are provided for maintaining an intermediate air gap between the electromagnets and the track. However, such an arrangement requires a relatively high amount of energy to energize the magnets in order to achieve the strong magnetic forces necessary.

Baermann also recognized that the use of superconductivity has been studied for this purpose. However, that use suffered from the difficulty of maintaining the low temperatures required by superconductivity along the entire track.

Baermann thus proposed a magnetic levitation system using electromagnets arranged in a repulsive force arrangement with lateral support structures for the vehicle. However, it remained a problem to avoid the need for providing power to such electromagnets. Thus, Baermann shows main permanent magnets and additional permanent magnets that span spaces between the main magnets which have like poles facing like poles, thus to increase the available suspension forces.

In the U.S. patent to Minovitch, U.S. Pat. No. 4,148,260, the use is disclosed of ceramic ferrite brick magnets placed in an end to end relationship along a steel channel, with a similar grouping opposed thereto, thus to eliminate flux leakage while providing lateral stability and an increased repulsive force.

It has, however, continued to be a problem in this art to effectively utilize permanent magnet systems for levitation, and to provide simple propulsion means for such Levitated systems.

It has also been a continuing problem in this art to provide a basic ceramic magnet unit to act as a building block for levitation systems which do not require electromagnetics.

These and other shortcomings of the prior art will become apparent from a review of the detailed description of this invention which follows.

BRIEF SUMMARY OF THE INVENTION

It is an overall object of this invention to provide a magnetic unit suitable for use in levitating a vehicle, such as a train, which unit uses permanent magnets, such as ceramic or ferrous magnets.

It is another overall object of this invention to provide such a magnetic unit using a plurality of permanent magnets, such as ceramic or ferrous magnets individually using malleable steel or malleable or molded iron between the magnets, and a plurality of such magnetic units connected together with such magnetically permeableable members therebetween.

It is another overall object of this invention to use such magnetic units on opposing portions of a support member for a train and a support member on a track system and arranged to controllably attract each other thus to cause levitation of the train relative to the track.

It is still another overall object of this invention to use such magnetic units in a linear motor having commutators on the fixed portion of the track and a movable core secured to the train.

These and other objects of this invention will become also become apparent from a detailed description of the invention which follows.

A main feature of the invention relates to a magnetic unit comprising a plurality of groups of permanent magnets such as ceramic or ferrous magnets arranged in a side-by-side relationship, each plurality being separated from an adjacent plurality by a magnetically permeable member, such as a malleable steel member or a malleable or molded iron member to focus the lines of magnetic flux. Preferably, each of the ceramic magnets within a group is also separated by an interleaved sheet of malleable steel. Such a plurality of groups of ceramic magnets are secured together and to a supporting member through fastening members, and are separated from the support by a non-magnetic member, such as a non-ferrous plate. A second plurality of groups of permanent magnets, such as ceramic or ferrous magnets, are positioned adjacent to a first plurality of such groups of ceramic magnets with like or opposite poles of the magnets facing each other so that the first and the second pluralities of such groups of magnets respectively repel or attract one another. Those forces of repulsion or attraction are used to cause levitation of a vehicle such as a train.

A second feature of the invention relates to a combination of a plurality of such groups of magnetic units so arranged relative to a support member of a train and an adjacent track member. A pair of such plurality of such groups of magnetic units are preferably positioned on opposed sides of the vehicle for balance and for increased levitation strength. A hydraulic unit, which may be microprocessor controlled, is used to adjust the air gap between respective pairs of such units.

A third main feature of the invention relates to the use of such units to provide a main component of a linear motor for propelling the train along the track. By initially energizing a prime mover on the train to initiate movement, the train is aided in its travel by a plurality of such magnetic units providing repeated alternating zones of attraction and repulsion. By use of a brush arrangement, the momentum of the train, once movement is initiated, is aided by travel through the zones wherein the magnetic forces of attraction aid movement of the train by attracting the train toward an attraction zone, and magnetic forces of attraction also aid movement of the train by repelling the train away from a repulsion zone.

These and other features of the invention will be seen in the detailed description of the invention which follows.

DETAILED DESCRIPTION OF THE PREFERRED EMBODIMENTS

Figure 1:
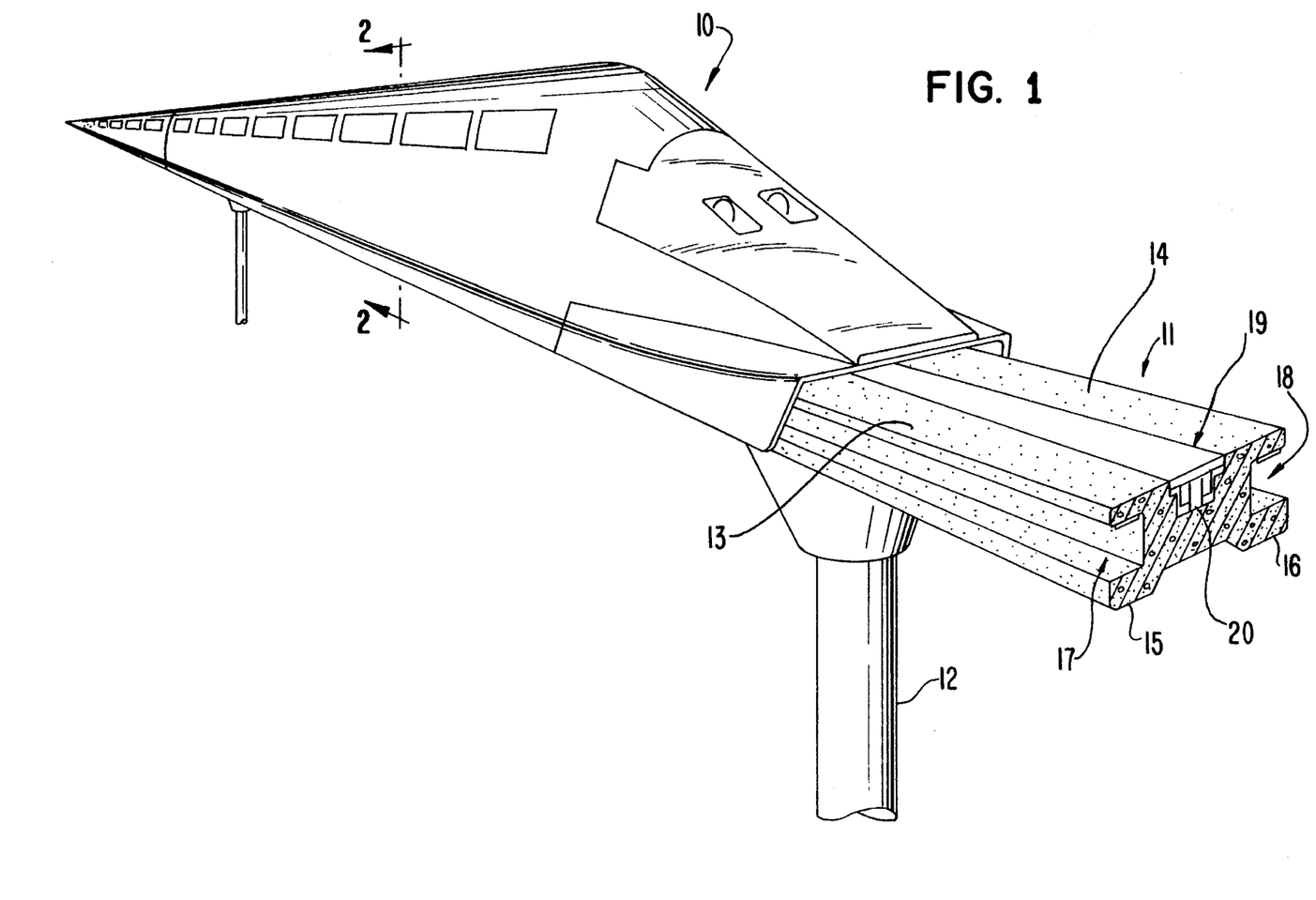
FIG. 1 is a perspective view of a train incorporating the invention travelling on a rail supported above the terrain.

In FIG. 1, a train 10 incorporating the invention is supported on an elongated concrete beam member 11 supported above the terrain by a plurality of stanchions 12. The beam member 11 includes a pair of spaced, opposed horizontal members 13, 14 extending generally horizontally at the top of the beam member 11, and a similar pair of spaced, opposed horizontal members 15, 16 extending generally horizontally at the bottom of the beam member 11. The beam member thus defines a pair of opposed, generally horizontally-extending channels 17, 18 each receiving magnetic rails for the train 10 as will be discussed in greater detail. The channel 17 is defined between the upper horizontally-extending member 13 and the lower horizontally-extending member 15, while the channel 18 is defined between the upper horizontally-extending member 14 and the lower horizontally extending member 16.

A second channel 20 is defined at the upper portion of the beam 11 for receiving a horizontally extending linear motor, referred to generally with the reference numeral 19. The linear motor 19 will be discussed in greater detail later in this specification.

Figure 2:
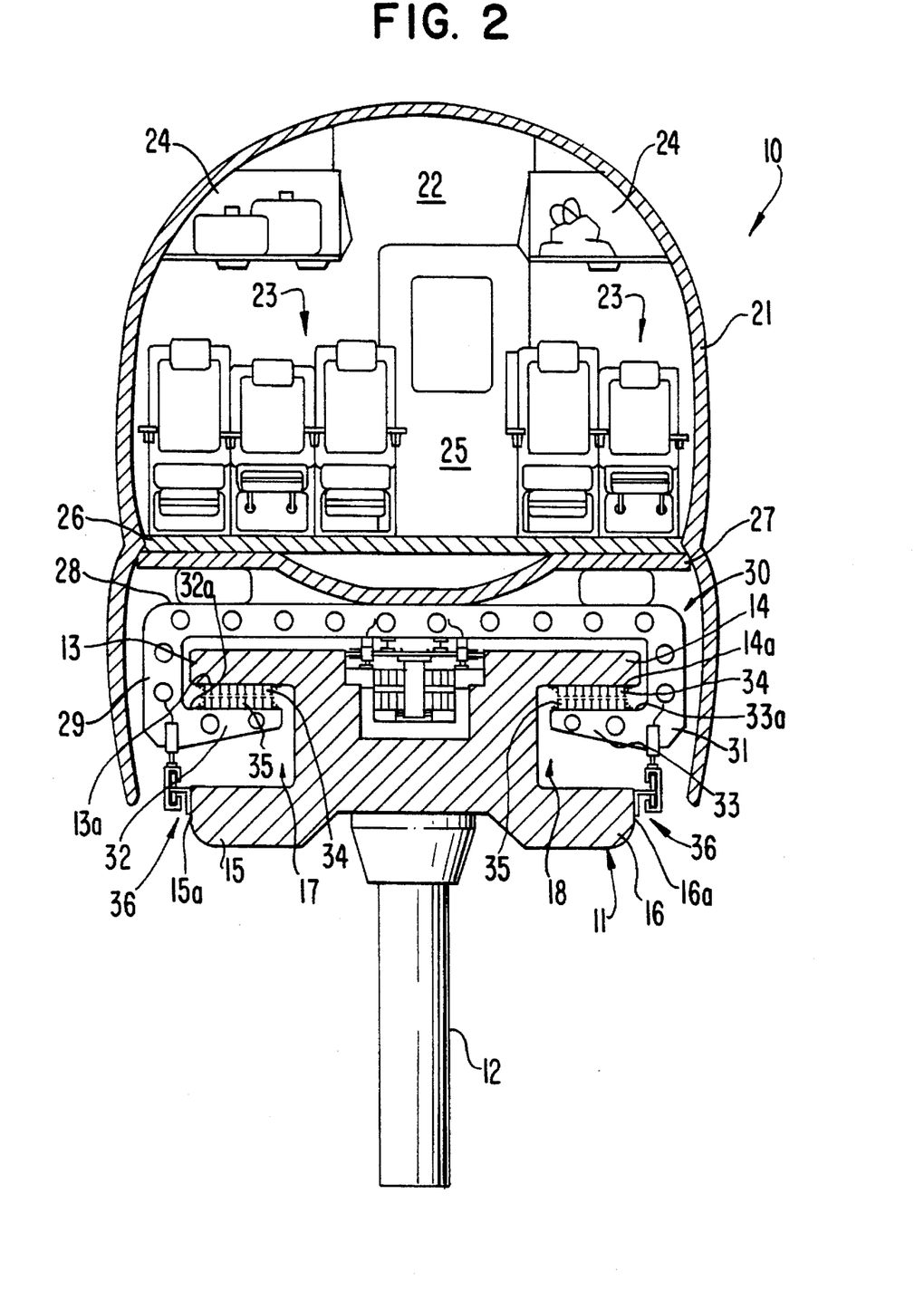
FIG. 2 is a cross sectional view of the train taken along the line 2—2 of FIG. 1.

FIG. 2 is a transverse cross sectional view of the train 10 taken along the line 2—2 of FIG. 1. The train 10 comprises, in simplified detail, an outer skin member 21 defining an interior compartment 22 having a plurality of seats 23 and overhead luggage compartments 24. An ingress/egress door is shown at 25. The interior compartment is supported on a structural bearing member 26. It should be understood that the depiction of the train 10 is representative and that the actual construction can assume a number of different forms well known in the public transportation arts.

The structural bearing member 26 extends transversely to the beam 11 and has a spring-like structural bearing member 27 secured at its opposed ends to the bearing member 26. A portion of the bearing member 27 is spaced from the bearing member 26 and contacts a massive C-shaped train support member 30 having a transversely extending surface portion 28, merging with opposed downwardly extending legs 29, 31 spaced apart wider that the upper surface of the beam 11 at its generally horizontally extending upper members 13, 14. Inwardly-turned horizontally extending bearing members 32, 33 are respectively secured at the opposed lower ends of the downwardly extending legs 29, 31 so as to define upper surfaces 29a, 31a which are normally spaced from lower surfaces 13a, 14a of the generally horizontally extending members 13, 14 of the beam 11. The inwardly-turned horizontally extending members 32, 33 thus extend inwardly within the channels 17, 18 for traveling along the beam.

A plurality of magnetic units shown generally at the reference numeral 34 are secured to the lower surfaces 13a, 14a of each of the horizontally extending members 13, 14 while a plurality of mating magnetic units shown generally at the reference numeral 35 are secured to the upper surfaces 32a, 33a of the members 32, 33. The magnetic units are arranged in pairs and their magnetic poles selected so that magnetically attractive forces are generated thus to attract the arms 32, 33 toward the members 13, 14. Thus, the downward weight of the train 10 can be controllably attracted to the lower surfaces 13a, 14a within limits sufficient to define an appropriate gap, as will be discussed. When so levitated, the train 10 can then be propelled longitudinally along the beam 11 by a minimal amount of force sufficient to overcome air friction and grade forces.

Figure 3:
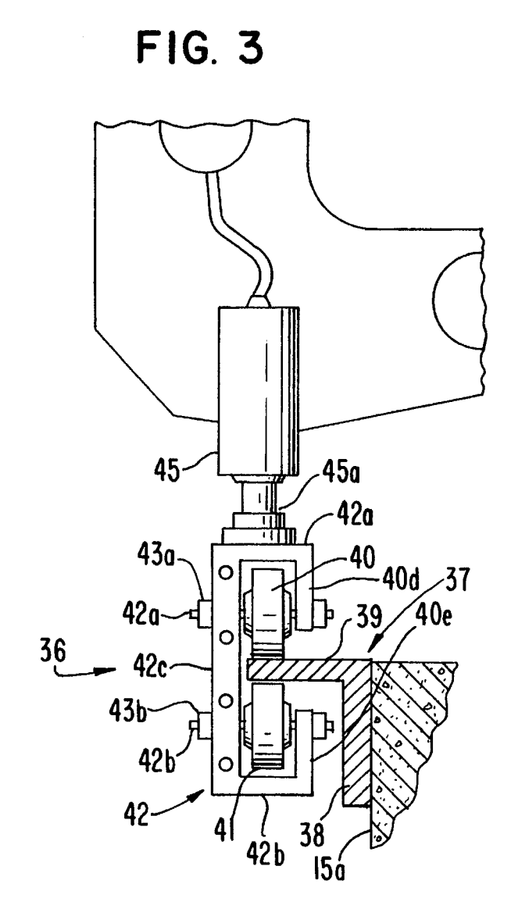
FIG. 3 is a front cross sectional view of a portion of FIG. 2 showing a portion of a hydraulic system used to control distance between magnetic fields.
Figure 4:
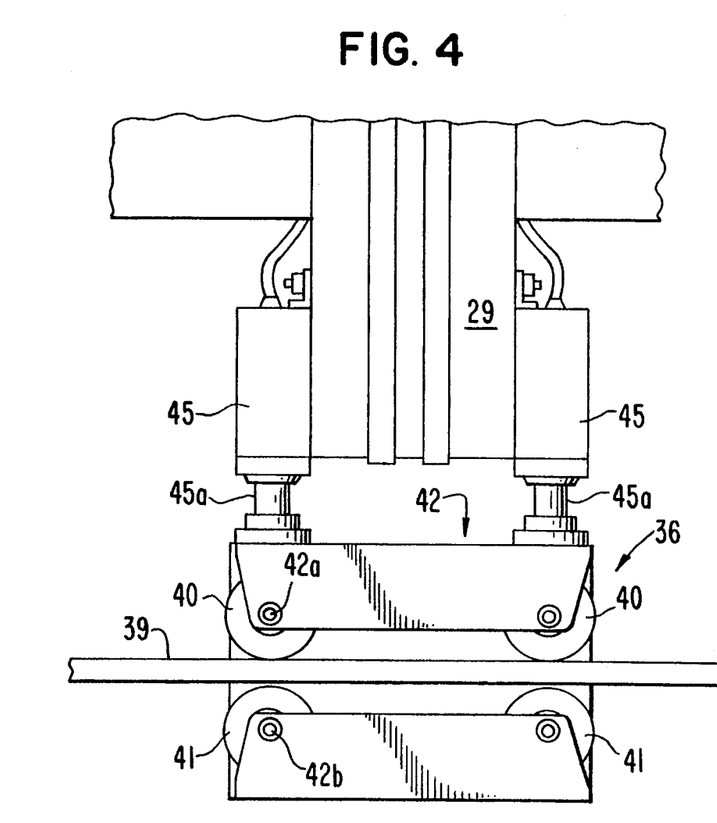
FIG. 4 is a lateral view of the same portion as shown in FIG. 3.

FIGS. 3 and 4 show an at-rest roller mechanism for the train, as shown generally at the reference numeral 36, having a hydraulic adjustment capability. Each of a pair of generally L-shaped members 37 has a generally vertical leg 38 secured to an outer surface 15a,16a of the lower, generally horizontally extending members 15, 16. The leg merges to a horizontally extending leg 39 spaced intermediate the outer horizontally extending surfaces of a pair of roller members 40, 41, each of which is respectively secured to a roller support bracket 42 which is C-shaped in cross section. The roller bracket 42 includes a horizontally extending upper surface 42a, a generally horizontally extending lower surface 42b spaced from the upper surface 42a, each of which respectively merges with a generally vertical member 42c. A pair of spaced vertically extending members 42c respectively merge at their ends with respective opposed ends of the members 42a, 42b. Thus, the rollers 40 are respectively rotationally mounted about axles 42a, 42b between the legs 40d and 40c, for the roller 40, and between the legs 40e and 40c. Securing nuts 43a, and 43b are secured at the opposed ends of the axles 42a and 42b.

An upper surface of the leg 42a is secured to a leg member 45a of a hydraulic actuator unit 45 secured to the member 29. The hydraulic actuator is controlled by microprocessors to maintain a predetermined air gap between the adjacent magnetic units 35. The computer will take into account such data as the current weight load of the train, the current air gap, the desired air gap, and the maintenance history of the rail. Starting with the units in juxtaposition, the hydraulic actuators will cause the units to separate to the desired degree of separation, e.g. about 1/8 to 1/4 in. or so.

Figure 5:
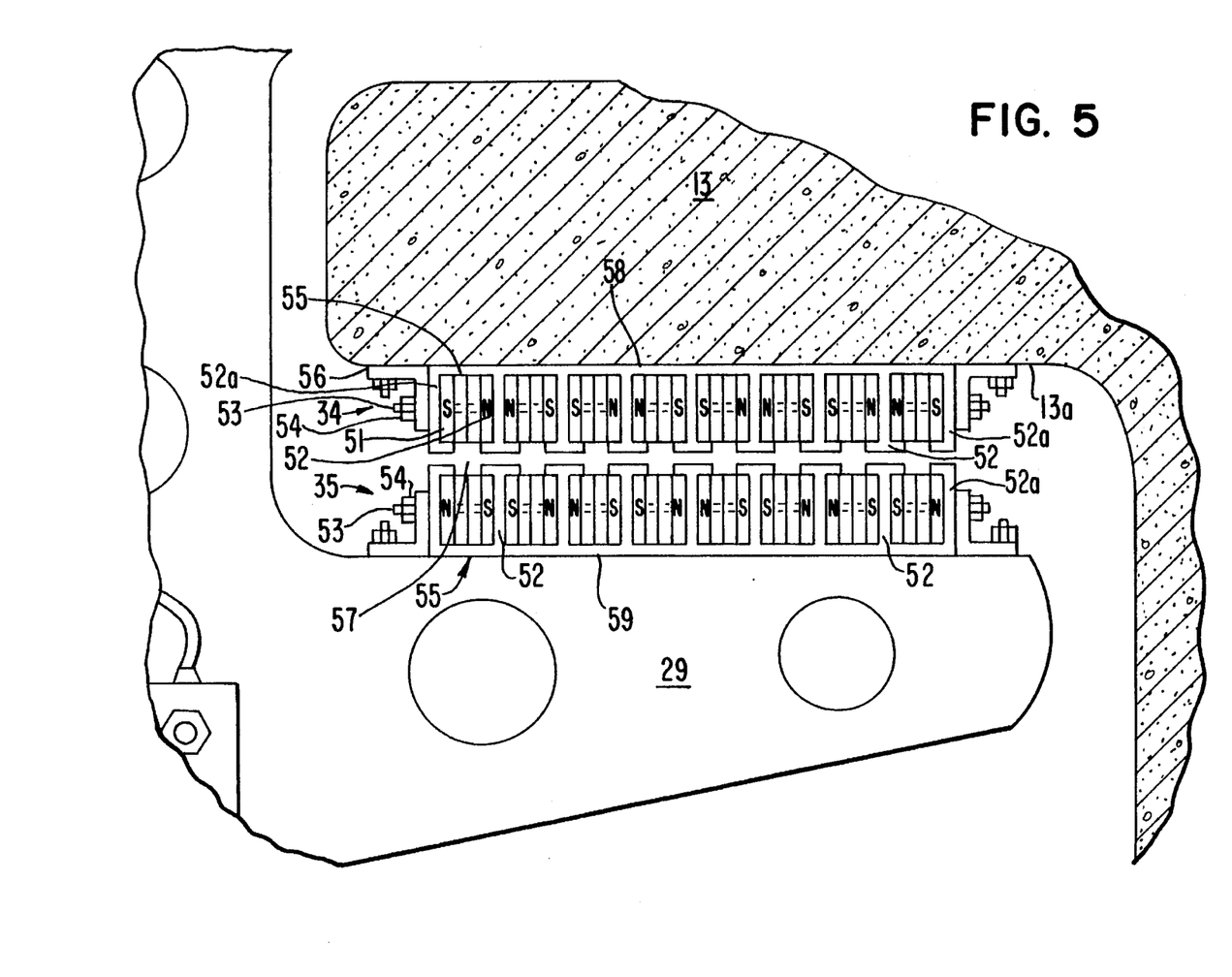
FIG. 5 is a front view, partially in cross section, showing a portion of the magnetic levitation system of FIG. 2.

FIG. 5 shows in greater detail the construction of each of the magnetic units 35. Each magnetic unit comprises a plurality of bar-shaped permanent magnets 51, such as ceramic or ferrous magnets separated by a plurality of generally T-shaped magnetically permeable members 52, such as malleable steel rails or malleable or molded iron members, wherein the end members 52a are generally L-shaped. A sandwich like construction unit 55 is formed by alternating an end member 52a, a permanent magnet 51, a magnetically permeable member 52, another permanent magnet 51 or a plurality of such magnets, and so forth. Each of the sandwich like construction units is secured together as by a non-magnetic bolt 53, secured at its opposing ends by a non-magnetic fastener 54. Preferably, each group of permanent magnets is separated by a magnetically permeable member located between adjacent permanent magnets, and each of a plurality of such groups is separated by a magnetically permeable member, such as malleable steel plate or a malleable or molded iron plate.

Ceramic magnets are readily commercially available and are selected for their magnetic strength and physical sizing from commercial sources. At present, ferrous permanent magnets are preferred because of their greater force capabilities. A suitable ferrous permanent magnet developed by Delco-Remy is known as a Magnequench brand permanent magnet and can attain an effective force of 12 to 14 kilogauss compared to ceramic magnets that can develop a force of 7 to 9 kilogauss. In contrast, the invention develops about 100 kilogauss when using the Magnequench brand permanent magnet and the magnetically permeable members.

The construction units 55 are respectively secured to the horizontally extended member 13 and to the support member 29 by a pair of opposed L-shaped members 56 respectively secured to both the members 13, 29 and to the construction units 55. The space between the construction units 55 is shown generally by the reference numeral 57 and is the space controlled by the hydraulic system shown in FIG. 4. A construction unit 51 is secured to the horizontally extending member through a non-ferrous metal protector 58. Similarly, a second construction unit 51 is secured to the support unit 29 through a non-ferrous metal protector 59.

The poles of the ceramic units are arranged to alternate linearly transversely across the unit 51. That is, the arrangement of magnets is S-N-N-S-S-N-N and so forth. In contrast, the adjacent unit 51 is arranged according to the scheme N-S-S-N-N-S-S and so forth. When placed adjacently, opposite poles are in register creating magnetic forces of attraction between the two units.

The construction units 55 thus use passive energy produced by a combination of ceramic magnets 51 and malleable steel members 52. This combination of materials provides the same results as conventional copper wire wound around a malleable steel core and electricity. An advantage of such a unit is that it does not create thermal energy to become hot and does not produce electromagnetic energy which may be harmful. Nor does it use energy except what is required to be applied to the ceramic magnets to produce permanent magnetic force.

The magnetic units 55 with an air gap 57 of 1/2" to 1/8" using the forces of attraction can levitate a great amount of weight at very low costs. A rail 1 1/4" thick can levitate 5 lbs. per sq. in. and a 3" rail can levitate 10 lbs. per sq. in. with an air gap of 1/8". Thus, vehicles traveling by this means of levitation effectively float above the travel rail with friction markedly reduced, thus producing little wear on the equipment. Energy consumption is limited to a start movement and displacing air drag and any grade changes on the track, and to operation of brakes (not shown).

Alternately, the respective magnet units can be positioned in supporting structures to repel one another when the forces of repulsion provide levitation for the unit.

Such units have many uses and may be used, for example, for high speed passenger trains traveling over 300 mph and for low speed innercity transportation, as well as for transporting freight. Thus, systems using such units save time and fuel, while protecting the environment from fuel emissions.

Figure 6:
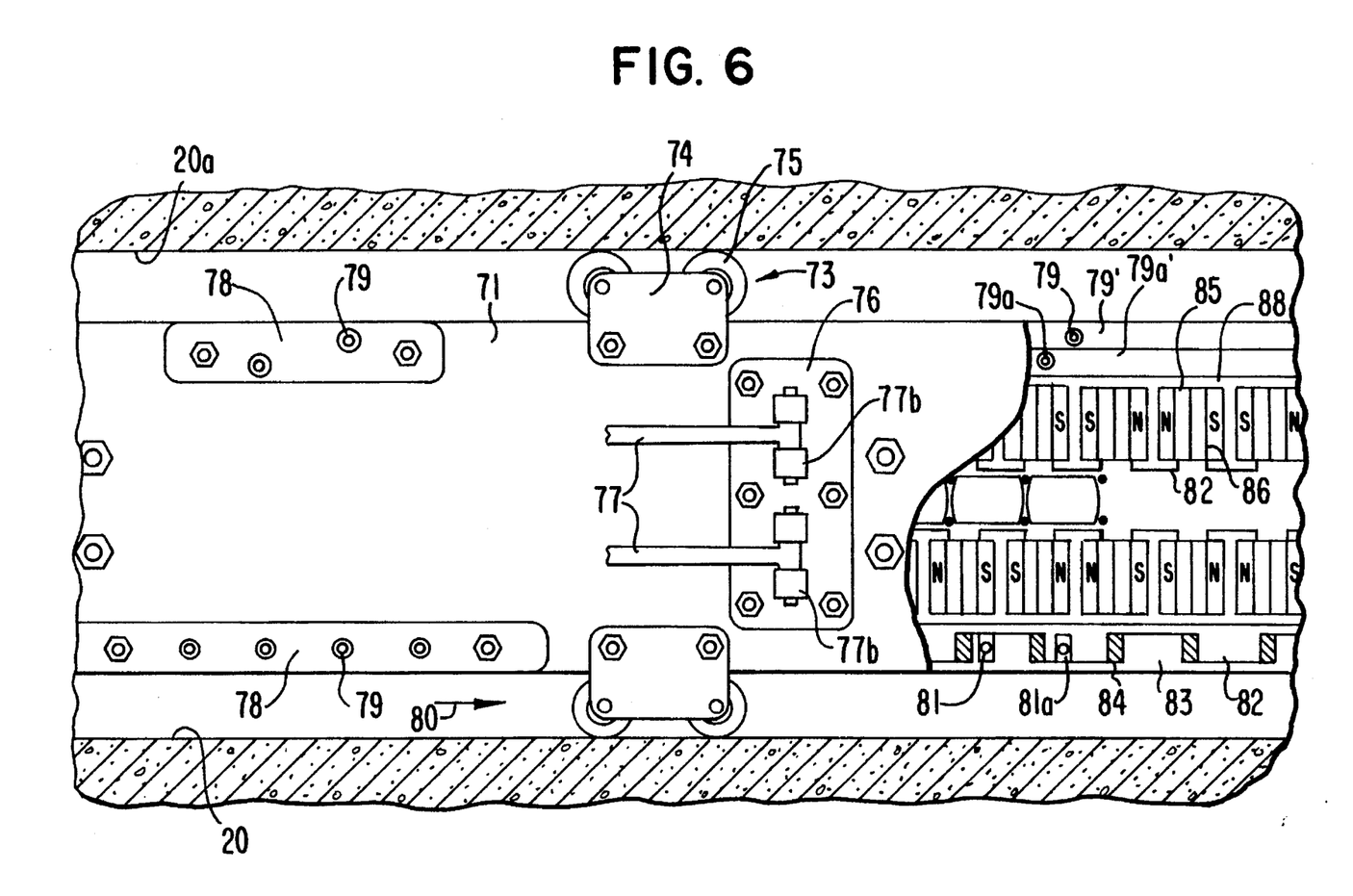
FIG. 6 shows an upper portion, partially cutaway, and viewed from above, of a linear motor used for propelling the train.

FIGS. 6 shows an upper partially cutaway view of the linear motor 19 located in the channel 20 of the beam 11, as best seen in FIG. 1. A motor chassis 71 is disposed beneath the train 10 in a manner suitable for the particular installation. The opposed inner wall surfaces 20a of the channel 20 receive a channel member 72 for contacting the lateral guides 73 of the mobile train chassis. Each guide 73 comprises a guide support 74 secured to the chassis 71, such as by bolt fasteners, which house a plurality of guide rollers 75 secured to the guide support 74 so as to be rotatable, such as on roller bearings. The opposed guides 73 provide lateral stability for the train when traversing the linear motor, and help prevent side-to-side sway. The chassis 71 is representatively shown as being suspended from the train through a support 76 secured to the chassis 71 and receiving a pair of suspension straps 77 in a pivotable relationship.

Figure 7:
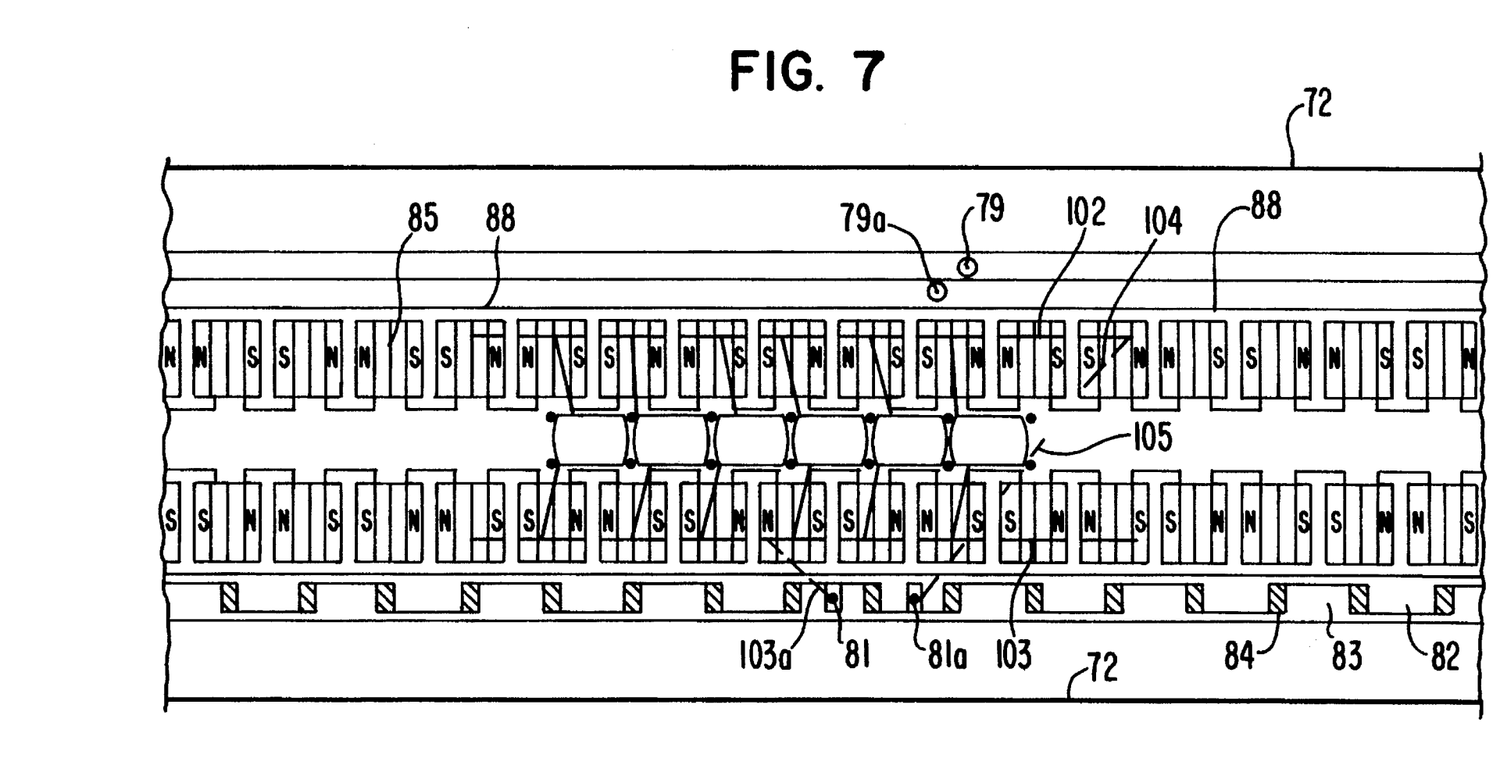
FIG. 7 shows the electrical connections between the windings and the brushes for the linear motor of FIG. 6.

A brush support member 78 is also secured to the chassis 71 for securing brushes 79, 79a contacting associated electrically-charged rails 79', 79a'. A support member 78 is mounted on each side of the chassis so that its associated brush 79, 79a can make contact with an electrical connection to the magnetic linear motor, in a matter which will be discussed, acting effectively as a commutator for a DC motor. Specifically, brushes 79, 79a are secured to the chassis, while associated brushes 81, 81a are connected to the windings of the motor, as seen in FIG. 7. A positive commutator pickup 82 is linearly spaced from a negative commutator pickup 83 and separated therefrom by a commutator neutral zone 84.

Once movement of the train is initiated, the travel of the train along alternately spaced positive and negative zones 82, 83 assists in maintaining traveling speed while minimizing or eliminating the need for power to the prime mover for the train which initiated such movement. Thus, the train in motion has a magnetically positive portion attracted to a forthcoming magnetically negative portion and is repelled by a just-passed magnetically positive portion. By such alternations, the commutation system acts like a rotary commutator, except that it is aligned along the rail.

FIG. 7 thus represents the electrical connections between the windings and the brushes. The diagram shows the position of the entrance and exit of electricity into each coil with about 50% of power in one position and the other 50% of power in another to create attraction or rejection depending on the relative position of the brushes.

In a manner similar to the levitation arrangement described in connection with FIG. 5, the linear motor 19 includes a plurality of magnetic units 51 each having permanent magnet members 85, such as ceramic or ferrous magnetic members, spaced by intermediate magnetically permeable members 86, such as malleable steel members, or malleable or molded iron, each unit being separated from an adjacent unit by a T-shaped magnetically permeable member 87 of the types described connected to a non-ferrous metal support 88.

Intermediate the generally parallel extending legs of the T-shaped members 87 is a channel 89 in which are positioned a plurality of metallic cores 90 about which are wound a plurality of turns 91 of conductive wire, such as copper. Such structure is best seen in FIG. 8.

Figure 8:
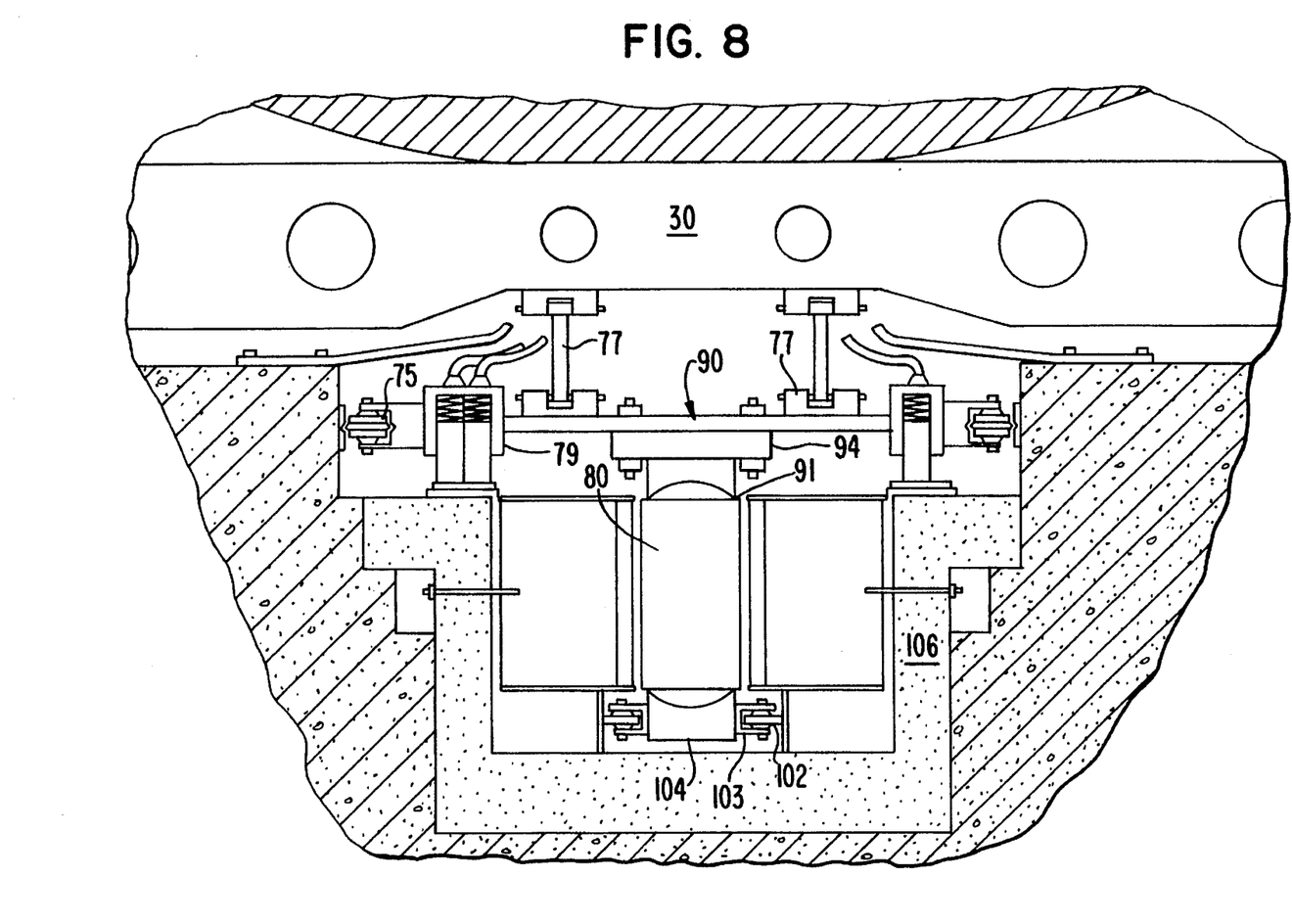
FIG. 8 shows a transverse cross sectional view of the linear motor of FIGS. 6 and 7.

As shown in FIG. 8, a pair of protective cover members cover the channel 19 and a portion of the motor arrangement. As can also be seen, the suspension strap 77 mates with a strap holder 77b on the frame 30 of the train, similar to the strap hanger 77a on the movable motor part. As can also be seen, the brush support 78 supports the brushes 78 in a biased relationship to maintain contact between a face of each brush, and the adjacent commutator section. The copper wire windings 91 are fixed to a plurality of central steel shields. The lower portion of the core 100 of windings 91 and metallic shields 90 is stabilized by a pair of opposed rollers 102 each of which is supported in a C-shaped member 103 secured to a base 104 of the core 100. The rollers 102 thus act as lower guides for the unit as the train and thus the core 100 traverses the fixed portions of the structure. The windings 91 are secured through a core support 94 to the support member 90.

On the other hand, the ceramic units 51 are fixed to a side support member 106 in the channel 19 so that the movable core may traverse therebetween.

The linear motor is thus arranged to save energy by using the passive energy of the ceramic magnets combined with the T-shaped separations made of a malleable steel. Thus, the ceramic magnets act like a copper winding on a nucleus of malleable steel creating a reaction of the steel molecules similar to a copper winding working with conventional electricity. The linear commutator thus has two rails of alternative live and dead zones fed by brushes changing negative to positive. The central nucleus can be grouped in multiples of eight or more nuclei, but each nucleus has its own sets of brushes so that each can run singly or jointly depending on the need.

Thus, returning to FIG. 7, it can be seen that a magnetically south bus 102 is connected through a lead 104 to the brush 81a, to cause that brush to act as a magnetic south member. A magnetically north bus 103a is connected through a lead 105a to the brush 81, to cause that brush to act as a magnetic north member. Note that the bus 102 is alternately connected to the core and windings of the magnetic units to assume a magnetically south orientation, while the bus 103a is oppositely connected.

Thus, a rail vehicle has been described which operates based on magnetic units of the type which comprise a plurality of permanent magnets such as ceramic or ferrous magnets supported therebetween by magnetically permeable members, such as malleable steel or malleable or molded iron, and spaced by such magnetically permeable T-shaped members. The magnetic units are secured to an underside of a support member of the train and the top of a support member of a rail, so that the forces of attraction between opposite poles, when concentrated by the malleable steel, effective lift the train off the support track. The train is linearly powered by a linear motor having a commutator structure along a channel along the track connected to a plurality of such magnetic units. The motor includes a movable core connected to a commutator structure. Thus, an efficient levitated train system with a linear motor propulsion system using ceramic magnets has been disclosed.

Figure 9:
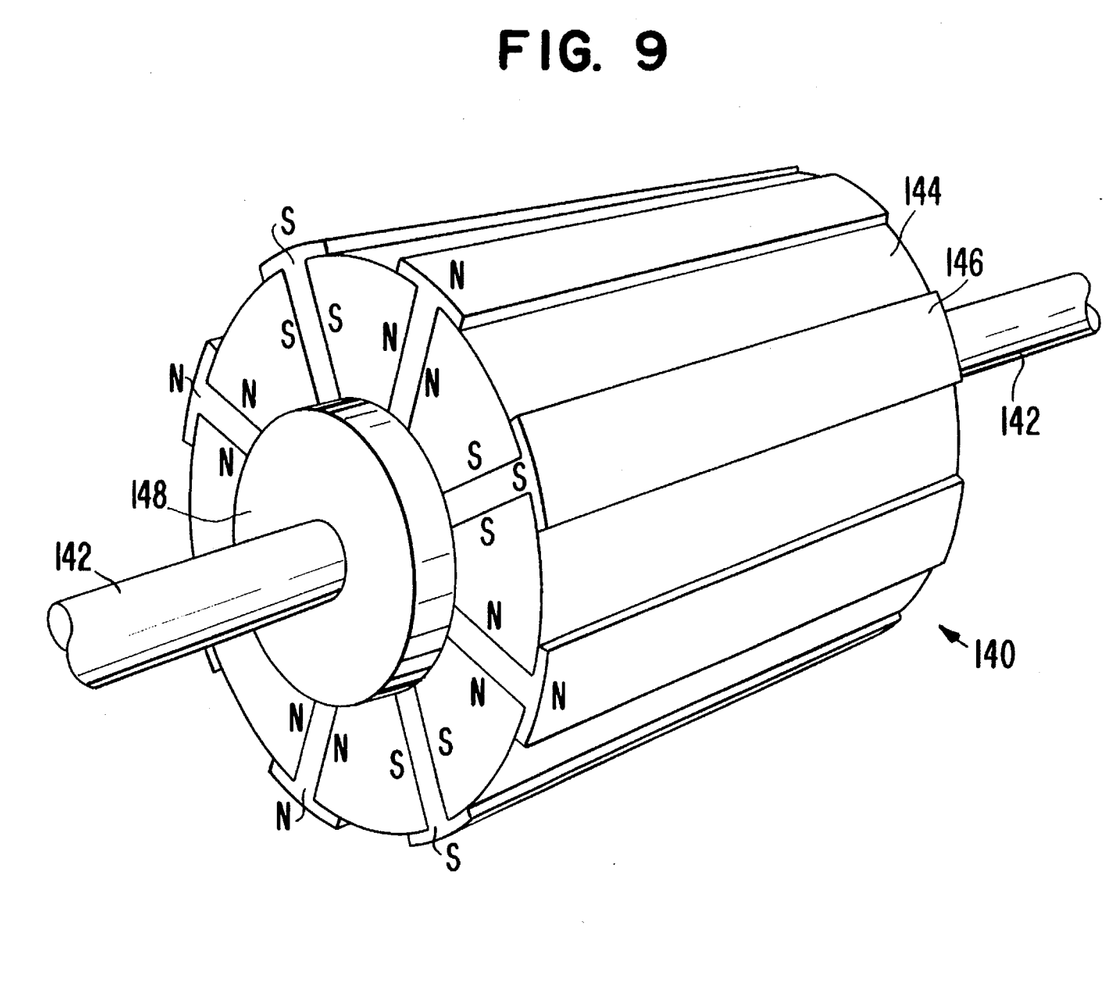
FIG. 9 shows a core rotor for a generator and motor using magnetic units of the type described.
Figure 10:
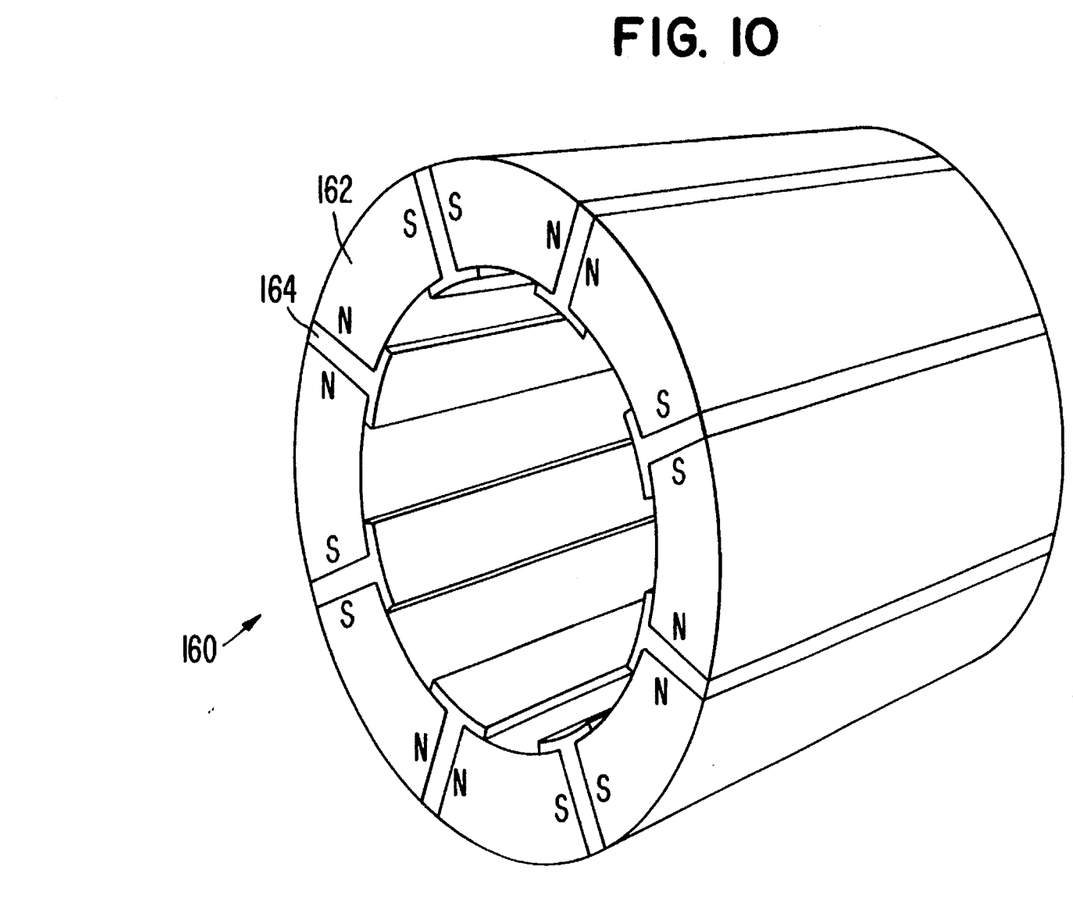
FIG. 10 shows a stator for a generator and motor using magnetic units of the type described and suitable for use with the core rotor of FIG. 9.

FIGS. 9 and 10 respectively show a core rotor and a stator for a rotating device for a generator and motor incorporating the principles of the invention. In FIG. 9, a core 140 is fixedly secured to an axially extending shaft 142 having a plurality of sector-shaped permanent members 144 located about the shaft 142. The members 144 are of the types described in connection with the prior embodiments. The magnets 144 are spaced by magnetically permeable members 146. The members 144 and 146 are secured to the shaft by a suitable end plate 148. It should be noted that adjacent magnetic members are positioned with like magnetic poles adjacent one another facing intermediate magnetically permeable members 146.

The stator 160 of FIG. 10 is similarly constructed of a rotationally spaced plurality of permanent magnetic units 162 of the type described interspersed about interleaved magnetically permeable members 164 of the types previously described. The rotational dynamics of this combination follow the teachings of the prior discussions.

While the preferred embodiments described herein set forth the best mode to practice this invention presently contemplated by the inventor for this continuation-in-part application, numerous modifications and adaptations of this invention will be apparent to others skilled in the art. Therefore, the embodiments are to be considered as illustrative and exemplary and it is understood that numerous modifications and adaptations of the invention as described in the claims will be apparent to those skilled in the art. Thus, the claims are intended to cover such modifications and adaptations as they are considered to be within the spirit and scope of this invention.

What is claimed is:

1. A magnetic unit, comprising:
   a group of at least a pair of adjacently-mounted permanent members comprising ceramic magnets;
   at least a pair of magnetically permeable members comprising malleable iron members or molded iron members, located adjacent each outer surface of said pair of adjacently-mounted ceramic magnets; and
   means for securing said pair of magnetically permeable members and said pair of permanent magnets, thus to provide a magnetic unit which concentrates its magnetic flux through said magnetically permeable members, wherein said magnetically permeable member located between said pair of said groups of said magnetic members is generally T-shaped; and further including at least a pair of said groups of said ceramic magnets forming said magnetic unit, and an additional magnetically permeable member located between said pair of said groups of said ceramic magnets.

2. The magnetic unit as set forth in claim 1, wherein a magnetically permeable member is located at outer surfaces of said permanent magnets forming said pair.

3. The magnetic unit as set forth in claim 1, further including a non-magnetic member located adjacent a surface of said magnetic unit for securing said magnetic unit to a support member.

4. The magnetic unit as set forth in claim 1 further including at least a pair of said groups of said permanent magnet members forming said magnetic unit, and an additional T-shaped magnetically permeable member located between said pair of said groups of said permanent magnet members.

5. The magnetic unit as set forth in claim 4 wherein said magnetically permeable members located at the outer surfaces of said permanent magnet members are generally L-shaped, and said magnetically permeable member located between said pair of said groups of said magnetic members is generally either L-shaped or T-shaped.

6. The magnetic unit as set forth in claim 4, wherein one of said pair of said groups of said permanent magnets is mounted on a support member of a vehicle, and another of said pair of said groups of said permanent magnets is mounted on a support member of a structure adjacent said vehicle, whereby magnetic interaction between said pair contributes to levitating said vehicle.

7. The magnetic unit as set forth in claim 6 wherein means are provided for controlling a gap between said magnetic units.

8. The magnetic unit as set forth in claim 7, wherein said means is a hydraulic unit which is microprocessor controlled.

9. The magnetic unit as set forth in claim 8 wherein a sufficient plurality of said pairs of said groups of magnets are positioned along a right-of-way to cause said vehicle to be levitated for transnational motion.

10. A system for supporting train for traveling while levitated, comprising:

a first support member forming a portion of said train;

a second support member for supporting said train, a plurality of groups of permanent magnets comprising either ceramic magnets or ferrous magnets adjacently placed in an elongated face to-face relationship on each of said first and said second support members, said groups of said permanent magnets being separated by magnetically permeable materials to focus lines of magnetic flux of said magnets, said plurality of said groups being positioned to attract each other, said magnetically permeable materials comprising at least one of malleable steel members, malleable iron members, or molded iron members located adjacent each outer surface of said pair of said permanent magnets; and means for controlling an air gap between said groups of permanent magnets on said first and said second support members.

11. The system as set forth in claim 10, wherein said first support member is a generally C-shaped member having inwardly-turned arm members with a surface thereon for securing a first group of said plurality of permanent magnetic units thereto;

said second support member defines a surface about parallel to said surface on said inwardly-turned arm member of said first support member for securing a second group of said plurality of said permanent magnetic units thereto, in an opposing relationship to said first group, the magnetic forces between said first and said second groups causing said train to levitate under the control of hydraulic means.

12. The system as set forth in claim 11, further including an intermediate projecting member secured to said second support member projecting intermediate a pair of guide rollers supported in a support unit, said hydraulic means including a hydraulic member connected to said support unit and to said first support member on said train.

13. The system as set forth in claim 11, further including a linear motor for assisting propulsion of said train, said linear motor including a plurality of said groups of said magnetic units located in an elongated channel in said second support member, said plurality of groups being respectively connected to form a first plurality of brush members along said path for said train with alternating positive and negative magnetic units;

a second plurality of brush members on said train for contacting said first plurality of brush members along said path.

14. A motor, for assisting movement of a movable member, comprising:

a plurality of magnetic units having a plurality of groups of permanent magnets comprising ceramic magnets or ferrous magnets disposed along a path, at least one magnetically permeable member comprising a malleable steel member, a malleable iron member, or a molded iron member located intermediate adjacent faces of said permanent magnets having a like magnetic polarity, thus to provide a said magnetic unit which concentrates its magnetic flux through said magnetically permeable members, wherein said magnetically permeable member of said unit is generally T-shaped;

means interconnecting with said plurality of said magnetic units for forming a plurality of respectively-located positive and negative brushes along said path;

a plurality of magnetic cores having windings thereabout, disposed on said path, so that alternative forces of attraction and repulsion assist movement of said movable member, said movable member being capable of movement along a linear path or a rotational path about an axis.

15. The motor as set forth in claim 14 wherein additional magnetically permeable members are located at the ends of said plurality of permanent magnets, and intermediate said groups of magnets, ends of said additional magnetically permeable members defining said path in which said core travels.

16. The motor as set forth in claim 15, wherein said cores are supported by roller members contacting a portion of a channel.

17. The motor as set forth in claim 16, wherein said cores are supported on a support member of a levitating train.

18. The motor as set forth in claim 17, wherein said brushes act as a linear commutator.

19. The motor as set forth in claim 18, wherein said brushes alternately form a positive magnetic portion, a negative magnetic portion, and an intermediate portion, said brushes on said path respectively contacting said portions to successively receive attractive and repulsive forces.

20. A system for supporting a train for traveling while levitated, comprising:

a first support member forming a portion of said train;

a second support member for supporting said train, a plurality of permanent magnets comprising ceramic magnets or ferrous magnets adjacently placed in an elongated face to-face relationship on each of said first and said second support members, adjacent faces of each of said permanent magnets being separated by magnetically permeable materials to focus lines of magnetic flux of said magnets, said plurality of said permanent magnets being positioned to attract each other; and means for controlling an air gap between said permanent magnets on said first and said second support members.

21. A magnetic unit, comprising:

at least a pair of adjacently-mounted permanent magnets forming said magnetic unit, each having a face and an edge, and comprising either ceramic magnets or ferrous magnets, like magnetic poles of said adjacently-mounted permanent magnets being adjacent each other;

a magnetically permeable member comprising a malleable steel member, a malleable iron member, or a cast iron member, positioned between adjacently-mounted permanent magnets, said magnetically permeable member being formed in the shape of a "T", a leg of said "T" being positioned between adjacent faces of said adjacently-mounted permanent magnets and a head of said "T" extending adjacent at least a portion of a face of each of said permanent magnets of said unit.

22. A magnetic unit as set forth in claim 21, comprising more than a pair of said adjacently-mounted permanent magnets in said unit.

23. A magnetic unit as set forth in claim 21, comprising three said adjacently-mounted permanent magnets in said unit, said unit positioned adjacent a like unit.

24. A magnetic unit as set forth in claim 21, wherein another T-shaped member of another magnetic unit is positioned having its head opposing and substantially in register with said T-shaped member.

25. A magnetic unit, comprising:

a group of at least a pair of adjacently-mounted permanent members comprising ferrous magnets;

at least a pair of magnetically permeable members comprising malleable iron members or molded iron members, located adjacent each outer surface of said pair of adjacently-mounted ferrous magnets; and means for securing said pair of magnetically permeable members and said pair of permanent magnets, thus to provide a magnetic unit which concentrates its magnetic flux through said magnetically permeable members, wherein said magnetically permeable members located between said pair of groups of magnetic members are generally T-shaped.

26. The magnetic unit as set forth in claim 25, wherein a magnetically permeable member having an L-shape is located adjacent an outer surface of said permanent magnets forming said pair.

27. The magnetic unit as set forth in claim 25, further including a non-magnetic member located adjacent a surface of said magnetic unit for securing said magnetic unit to a support member.

28. The magnetic unit as set forth in claim 25 further including at least a pair of said groups of said permanent magnet members forming said magnetic unit, and an additional magnetically permeable member located between said pair of said groups of said permanent magnet members.

29. The magnetic unit as set forth in claim 25 wherein said magnetically permeable members located at the outer surfaces of said permanent magnet member are generally L-shaped, and said magnetically permeable member located between said pair of said groups of said magnetic members is generally T-shaped.

30. The magnetic unit as set forth in claim 25, wherein one of said pair of said groups of said permanent magnets is mounted on a support member of a vehicle, and another of said pair of said groups of said permanent magnets is mounted on a support member of a structure adjacent said vehicle, whereby magnetic interaction between said pair contributes to levitating said vehicle.

31. The magnetic unit as set forth in claim 25 wherein means are provided for controlling a gap between said magnetic units.

32. The magnetic unit as set forth in claim 31, wherein said means is a hydraulic unit which is microprocessor controlled.

33. The magnetic unit as set forth in claim 32 wherein a sufficient plurality of said pairs of said groups of magnets are positioned along a right-of-way to cause said vehicle to be levitated for transnational motion.

* * * * *